(12) United States Patent
Takenaka

(10) Patent No.: US 10,681,241 B2
(45) Date of Patent: Jun. 9, 2020

(54) INFORMATION PROCESSING APPARATUS CAPABLE OF ACQUIRING AND TRANSMITTING DEVICE INFORMATION, COMMUNICATION SYSTEM, COMMUNICATION METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Shuichi Takenaka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/357,599

(22) Filed: Mar. 19, 2019

(65) Prior Publication Data

US 2019/0306365 A1 Oct. 3, 2019

(30) Foreign Application Priority Data

Mar. 27, 2018 (JP) .................................. 2018-060740

(51) Int. Cl.
*G06F 15/00* (2006.01)
*G06F 3/12* (2006.01)
(Continued)

(52) U.S. Cl.
CPC ..... *H04N 1/32053* (2013.01); *H04N 1/00244* (2013.01); *H04N 1/00307* (2013.01); (Continued)

(58) Field of Classification Search
CPC ........... H04N 1/32053; H04N 1/00244; H04N 1/00307; H04N 1/00344; H04N 1/32767; (Continued)

(56) References Cited

U.S. PATENT DOCUMENTS

2004/0212827 A1\* 10/2004 Otsuji ................ H04N 1/32122
358/1.15
2009/0011708 A1\* 1/2009 Kim ........................ H04L 67/16
455/41.3

FOREIGN PATENT DOCUMENTS

JP 2015-216568 A 12/2015

OTHER PUBLICATIONS

Shuichi Takenaka, U.S. Appl. No. 16/360,459, filed Mar. 21, 2019.

\* cited by examiner

*Primary Examiner* — Douglas Q Tran
(74) *Attorney, Agent, or Firm* — Venable LLP

(57) ABSTRACT

An information processing apparatus includes a wireless interface configured to perform communication with an image forming apparatus, and at least one controller configured to function as a unit configured to acquire device information of the image forming apparatus from the image forming apparatus through the wireless interface, and a unit configured to selectively accept one of a first instruction to transmit the acquired device information to an external destination and a second instruction not to transmit the acquired device information to the external destination. The controller also functions as a unit configured to transmit, in a state where the first instruction has been accepted, the acquired device information to the external destination, and hold, in a state where the second instruction has been accepted, the acquired device information without transmitting the acquired device information to the external destination.

17 Claims, 12 Drawing Sheets

(51) Int. Cl.
    *G06K 1/00*           (2006.01)
    *H04N 1/32*          (2006.01)
    *H04N 1/00*          (2006.01)
    *H04N 1/333*        (2006.01)
    *H04N 1/327*        (2006.01)
    *H04L 29/08*        (2006.01)

(52) U.S. Cl.
    CPC ..... *H04N 1/00344* (2013.01); *H04N 1/32767* (2013.01); *H04N 1/32771* (2013.01); *H04N 1/33307* (2013.01); *H04L 67/10* (2013.01); *H04N 2201/0094* (2013.01)

(58) Field of Classification Search
    CPC ........... H04N 1/32771; H04N 1/33307; H04N 2201/0094
    USPC ............................... 358/1.13, 1.14, 1.15, 1.1
    See application file for complete search history.

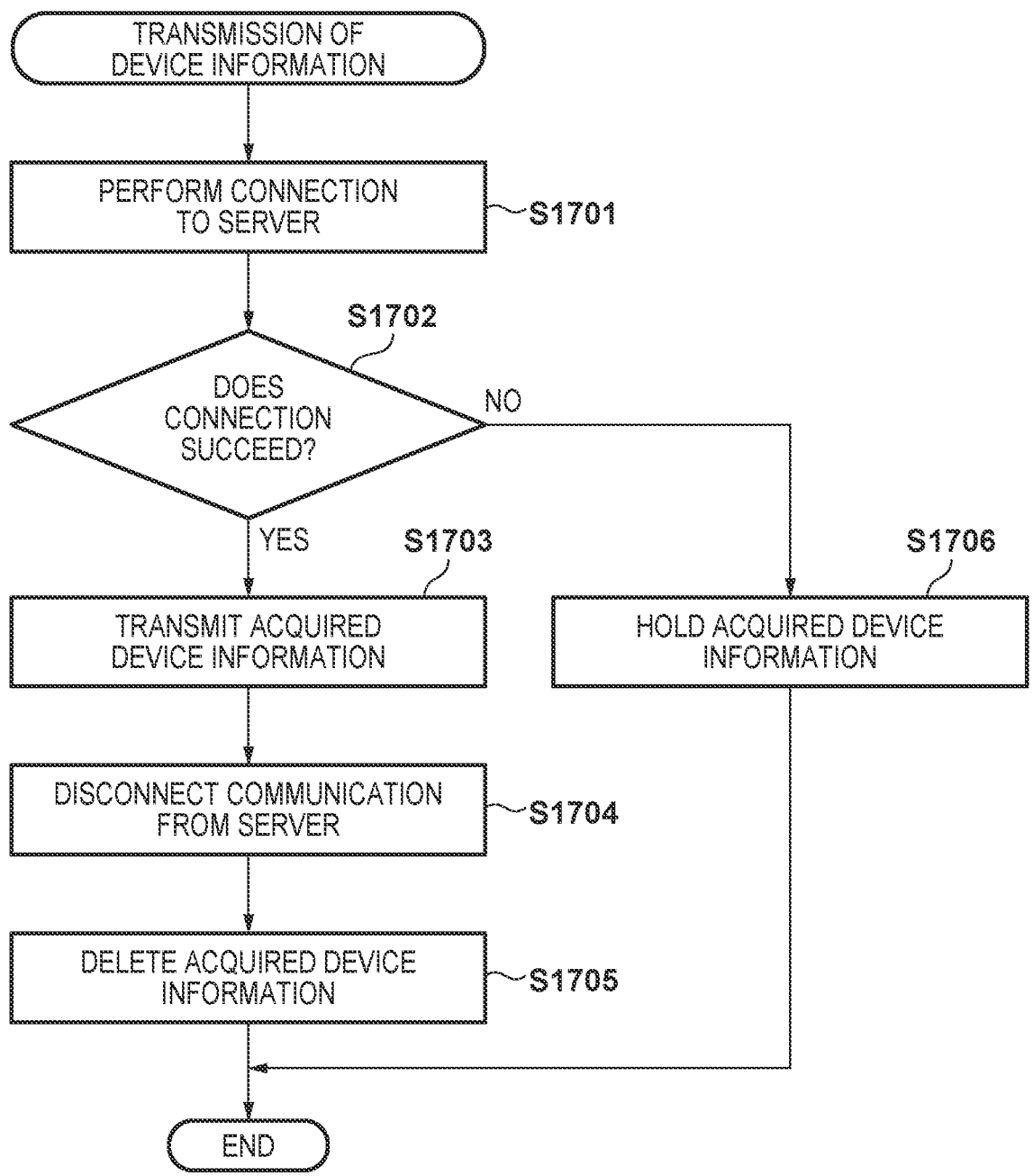

INFORMATION PROCESSING APPARATUS CAPABLE OF ACQUIRING AND TRANSMITTING DEVICE INFORMATION, COMMUNICATION SYSTEM, COMMUNICATION METHOD, AND NON-TRANSITORY COMPUTER-READABLE STORAGE MEDIUM STORING PROGRAM

BACKGROUND OF THE INVENTION

Field of the Invention

The present invention relates to an information processing apparatus capable of acquiring device information from an image forming apparatus, a communication system, a communication method, and a non-transitory computer-readable storage medium storing a program.

Description of the Related Art

In recent years, development and deployment of a technique in which an image forming apparatus and a mobile terminal cooperate with each other have advanced. In addition to a telephone function, email transmission/reception, and connection to the Internet, the mobile terminal can provide various services such as a service for supporting user's health management by communicating/cooperating with peripheral devices selectively using various communication techniques. In communication/cooperation with the image forming apparatus, there are provided a cooperation technique of directly transmitting print data from the mobile terminal to the image forming apparatus or transmitting, to the mobile terminal, a printed material scanned by the image forming apparatus. In addition, there is provided a technique of improving the maintainability of the image forming apparatus. As such technique, Japanese Patent Laid-Open No. 2015-216568 is known.

According to Japanese Patent Laid-Open No. 2015-216568, a mobile terminal and an image forming apparatus perform short-distance wireless communication, thereby transmitting device information in the image forming apparatus at this time to the mobile terminal. The mobile terminal transmits the acquired device information to a maintenance server, and registers it. The maintenance server can analyze failure information and the statuses of the consumable items of the image forming apparatus based on the device information, and notify a serviceman of appropriate maintenance information in accordance with the current status. This allows the serviceman to obtain, in a short time, appropriate information indicating the current status of the image forming apparatus and a maintenance operation to be performed, regardless of the skill of the serviceman, thereby improving the maintainability.

However, in Japanese Patent Laid-Open No. 2015-216568, a procedure of acquiring device information from the image forming apparatus and transmitting it to the maintenance server is performed as processing. If, for example, a communication error occurs in processing of transmitting the device information in an environment in which the radio field intensity for communication with the maintenance server is weak, it is necessary to wait while performing retry processing until a connection can be performed or to abandon the processing. If the processing is abandoned, it is necessary to reconsider the network environment, and perform the processing again from a step of acquiring device information from the image forming apparatus.

SUMMARY OF THE INVENTION

An aspect of the present invention is to eliminate the above-mentioned problems with the conventional technology. The present invention provides an information processing apparatus, a communication system, a communication method, and a non-transitory computer-readable storage medium storing a program for improving convenience in processing of externally transmitting device information acquired from an image forming apparatus.

The present invention in one aspect provides an information processing apparatus comprising: an acquisition unit configured to acquire device information of an image forming apparatus from the image forming apparatus; a first acceptance unit configured to selectively accept one of an instruction to transmit the device information acquired by the acquisition unit to an external unit and an instruction to hold the device information in the information processing apparatus; and a transmission control unit configured to transmit, if the first acceptance unit accepts the instruction to transmit the device information to the external unit, the device information acquired by the acquisition unit to the external unit, and hold, if the first acceptance unit accepts the instruction to hold the device information in the information processing apparatus, the device information acquired by the acquisition unit in the information processing apparatus without transmitting the device information to the external unit.

According to the present invention, it is possible to improve convenience in processing of externally transmitting device information acquired from an image forming apparatus.

Further features of the present invention will become apparent from the following description of exemplary embodiments with reference to the attached drawings.

BRIEF DESCRIPTION OF THE DRAWINGS

FIG. 17 is a flowchart illustrating device information transmission processing in the mobile terminal;

DESCRIPTION OF THE EMBODIMENTS

Figure 1:
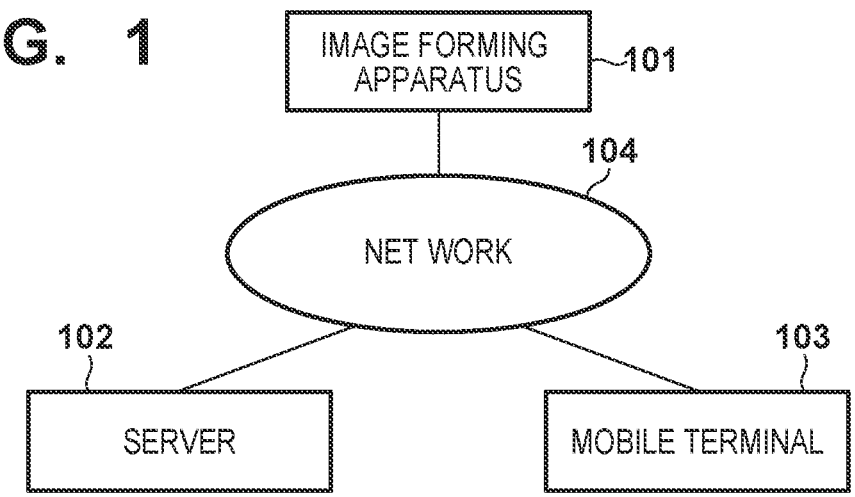
FIG. 1 is a view showing the arrangement of a system.

Preferred embodiments of the present invention will now be described hereinafter in detail, with reference to the accompanying drawings. It is to be understood that the following embodiments are not intended to limit the claims of the present invention, and that not all of the combinations of the aspects that are written according to the following embodiments are necessarily required with respect to the means to solve the problems according to the present invention. Note that the same reference numerals denote the same components and a description thereof will be omitted.

First Embodiment

<Overview>

In this embodiment, at the timing of completion of acquisition of device information from an image forming apparatus, transmission control is performed to make it possible to select whether to continuously transmit the device information to a maintenance server or hold the device information in a memory area of a mobile terminal without transmitting it. With this arrangement, it is possible to continuously transmit the device information in an environment in which a communication status with the maintenance server is good. In an environment in which the communication status is not good, the acquired device information can be temporarily held in the memory area of the mobile terminal, and then transmitted to the maintenance server later after moving to an environment in which the communication status is good. This makes it possible to acquire only the device information of the image forming apparatus even in an environment in which it is impossible to communicate with the maintenance server at all. In addition, an operation of acquiring pieces of device information of a plurality of image forming apparatuses and collectively transmitting them to the maintenance server later is possible.

<View of System Arrangement>

An example of the arrangement of a communication system according to this embodiment will be described with reference to FIG. 1. The communication system (to be simply referred to as the system hereinafter) according to this embodiment includes an image forming apparatus 101, a server 102, and a mobile terminal 103. The image forming apparatus 101, the server 102, and the mobile terminal 103 are connected via a network 104.

The image forming apparatus 101 is a multi-function peripheral having various functions such as a scan, FAX, print, and copy functions or a printer having only a print function. The image forming apparatus 101 holds logs obtained when executing various jobs, the consumption counter values of constituent device parts, and an internal log obtained when an error occurs.

The server 102 unitarily manages a plurality of image forming apparatuses installed in respective locations, and analyzes device information of the image forming apparatus 101 transmitted directly from the image forming apparatus 101 via the network 104 or transmitted indirectly via the mobile terminal 103. An analysis result is transmitted to the mobile terminal 103 or the PC of a serviceman in the form of arranged maintenance information, and used to improve the maintainability.

The mobile terminal 103 is a mobile phone, a PDA, or an information processing apparatus such as a multi-function mobile phone (to be referred to as a smartphone hereinafter) or a tablet. In this embodiment, a smartphone will be exemplified but the mobile terminal 103 may be in any form that includes a wireless communication unit capable of acquiring the device information from the image forming apparatus 101, and transmitting it to the server 102. The network 104 is a wireless or wired network formed by a WAN or LAN.

<Hardware Block Diagram of Image Forming Apparatus>

Figure 2:
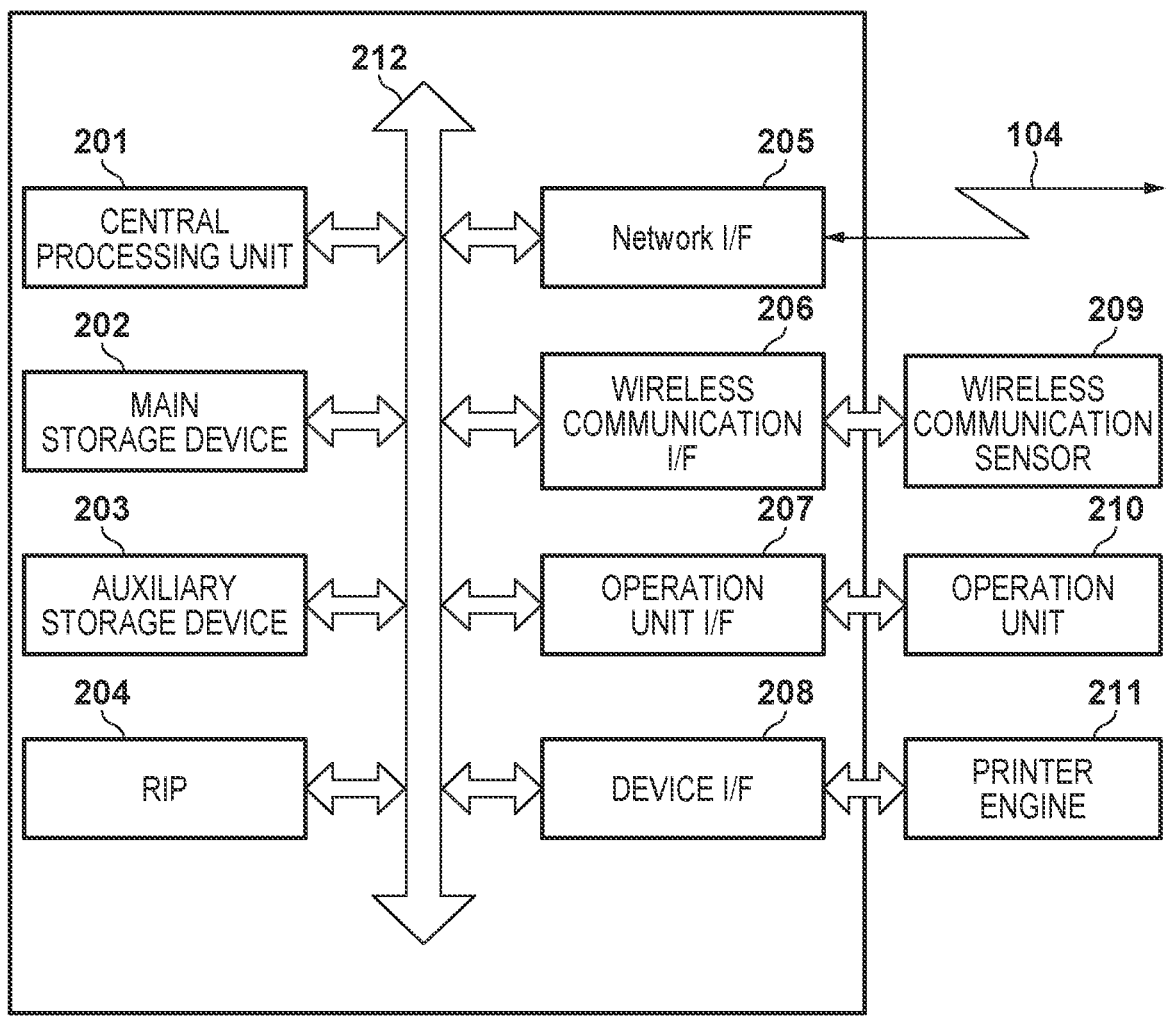
FIG. 2 is a block diagram showing the arrangement of the hardware blocks of an image forming apparatus.

FIG. 2 is a hardware block diagram showing the arrangement of the image forming apparatus 101. Referring to FIG. 2, a central processing unit 201 reads out a program stored in an auxiliary storage device 203 into a main storage device 202, and executes it. Furthermore, the central processing unit 201 comprehensively controls respective devices connected to a system bus 212.

The main storage device 202 functions as the main memory and the work memory of the central processing unit 201. The auxiliary storage device 203 is used for the purpose of holding a large amount of data temporarily or for a long time. The device information according to this embodiment is held in the memory area at a predetermined timing such as the timing of execution of a job, the timing of detection of a change in state of a part, the timing of occurrence of an error, or the timing of reaching a periodic holding schedule time.

A RIP 204 is hardware of rasterizing intermediate print data into a raster image. A network I/F 205 is a wired network unit that is connected to the network 104 and serves to input/output print data and device information to/from a unit external to the printer. When transmitting, to the server 102, the device information held in the auxiliary storage device 203, this is performed from the network I/F 205 at the above-described predetermined timing.

A wireless communication I/F 206 is an interface unit with a wireless communication sensor 209, and plays a role of transmitting, to the central processing unit 201, information transmitted/received to/from the wireless communication sensor 209. The wireless communication sensor 209 transmits/receives data to/from a peripheral device supporting wireless communication using a wireless communication standard such as Wi-Fi. In this embodiment, when transmitting the device information to the mobile terminal 103, the device information is transmitted via the wireless communication sensor 209.

An operation unit I/F 207 is an interface unit with an operation unit 210, and outputs, to the operation unit 210, image data to be displayed on the operation unit 210. The operation unit I/F 207 plays a role of transmitting, to the central processing unit 201, information input by the user of the image forming apparatus 101 from the operation unit 210. The operation unit 210 includes a liquid crystal panel and a sound source as output units, and includes a touch panel, hard keys, and a microphone as input units.

A device I/F 208 sends an image signal, instructs a device operation, or transmits/receives device information based on an instruction from the central processing unit 201. A printer engine 211 is an output device that outputs the image signal onto a print medium, and may adopt an electrophotographic method or an inkjet printing method.

Furthermore, a disk drive for a portable disk recording medium such as a CD or DVD, a memory reader/writer for a portable nonvolatile recording medium such as a flash memory, or the like may be connected to the system bus 212. A program in which processing contents according to this embodiment are written can be saved in the auxiliary storage device 203 via a portable storage medium, and then installed in the image forming apparatus 101.

<Hardware Block Diagram of Server>

Figure 3:
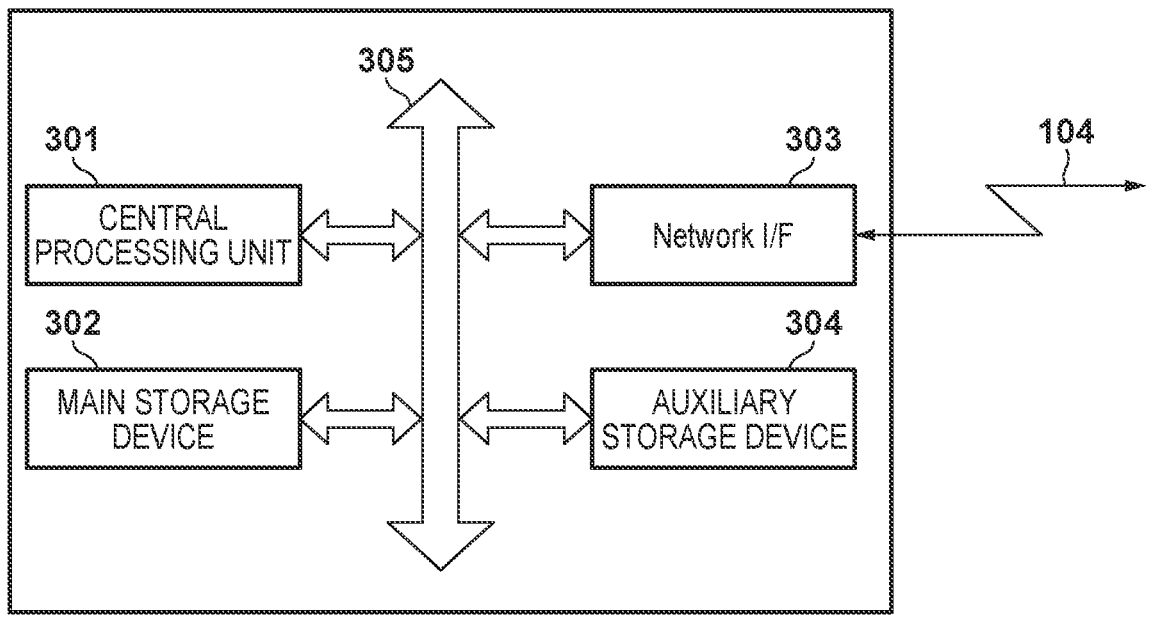
FIG. 3 is a block diagram showing the arrangement of the hardware blocks of a server.

FIG. 3 is a hardware block diagram for explaining the arrangement of the server 102. In the server 102, a program in which processing contents according to this embodiment are written is saved in an auxiliary storage device 304 and installed in the server 102. A central processing unit 301 reads out the program stored in the auxiliary storage device 304 into a main storage device 302, and executes it. Furthermore, the central processing unit 301 comprehensively controls respective devices connected to a system bus 305.

The main storage device 302 functions as the main memory and the work memory of the central processing unit 301. A network I/F 303 is connected to the network 104, and used to communicate with a unit external to the server 102. Alternatively, the program can be installed in the auxiliary storage device 304 via the network I/F 303. The device information transmitted from the image forming apparatus 101 or the mobile terminal 103 is received by the network I/F 303, and the result of analyzing the device information by the server 102 is transmitted via the network I/F 303. The auxiliary storage device 304 stores an operating system and the main body of the control program in which the processing contents according to this embodiment are written. The device information of the image forming apparatus 101 according to this embodiment is also held in the memory area.

A disk drive for a portable disk recording medium such as a CD or DVD, a memory reader/writer for a portable nonvolatile recording medium such as a flash memory, or the like may be connected to the system bus 305. The program in which the processing contents according to this embodiment are written can be saved in the auxiliary storage device 304 via a portable storage medium, and then installed in the server 102.

<Hardware Block Diagram of Mobile Terminal>

Figure 4:
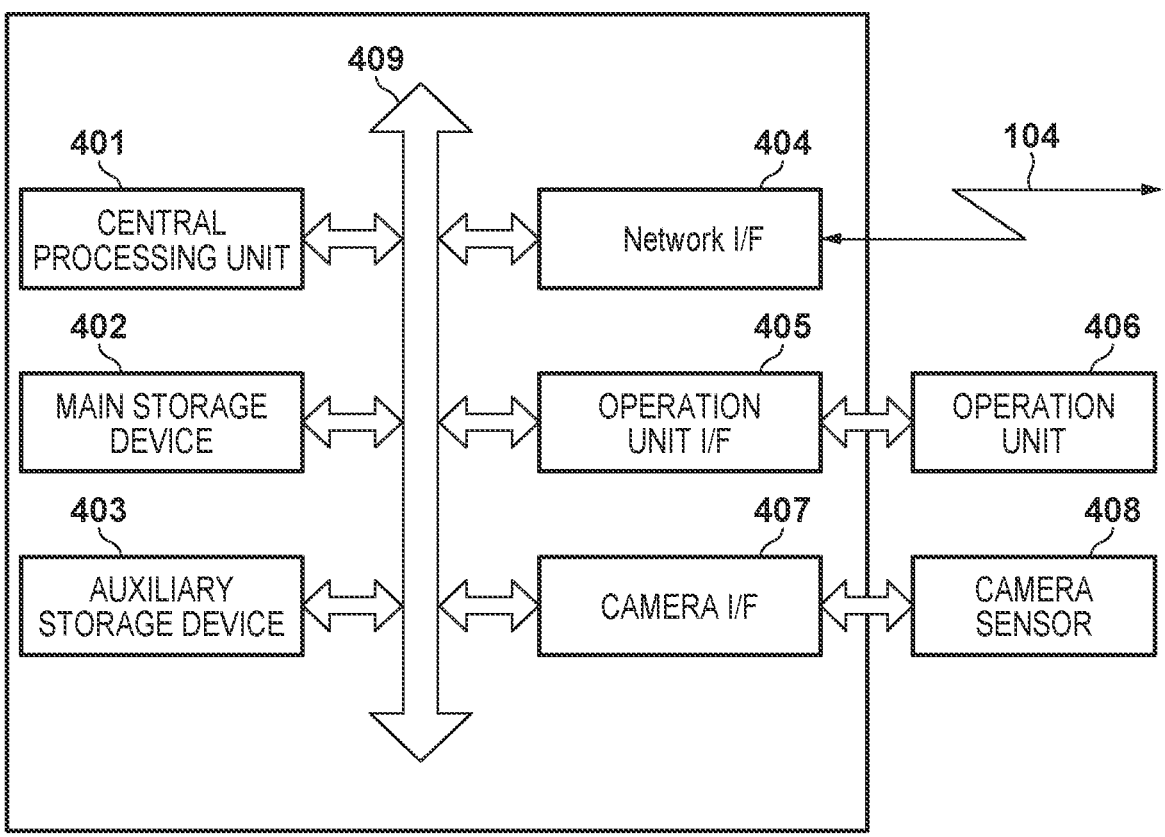
FIG. 4 is a block diagram showing the arrangement of the hardware blocks of a mobile terminal.

FIG. 4 is a hardware block diagram for explaining the arrangement of the mobile terminal 103 according to this embodiment. In the mobile terminal 103, a program in which processing contents according to this embodiment are written is saved in an auxiliary storage device 403 and installed in the mobile terminal 103. A central processing unit 401 reads out the program stored in the auxiliary storage device 403 into a main storage device 402, and executes it. Furthermore, the central processing unit 401 comprehensively controls respective devices connected to a system bus 409.

The main storage device 402 functions as the main memory and the work memory of the central processing unit 401. The auxiliary storage device 403 stores an operating system and the main body of the control program of the mobile terminal 103. The auxiliary storage device 403 is used for the purpose of holding a large amount of data temporarily or for a long time. Therefore, the device information acquired from the image forming apparatus 101 is held in the memory area until transmission to the server 102 is completed or a deletion instruction is received from the user.

A network I/F 404 is connected to the network 104 to be connected to an information terminal external to the mobile terminal 103 via a wireless network, and serves to input/output communication data. Alternatively, it is possible to perform connection to an application distribution service via the network I/F 404, download mobile application data, and then install it in the auxiliary storage device 403.

An operation unit I/F 405 is an interface unit with an operation unit 406, and outputs, to the operation unit 406, image data to be displayed on the operation unit 406. The operation unit I/F 405 plays a role of transmitting, to the central processing unit 401, information input by the user of the mobile terminal 103 from the operation unit 406. The operation unit 406 includes a liquid crystal panel and a sound source as output units, and includes a touch panel, hard keys, and a microphone as input units.

A camera I/F 407 is an interface unit with a camera sensor 408, which operates the camera sensor 408 and acquires image data captured by the camera sensor 408. The camera sensor 408 is a camera mounted on the mobile terminal 103. The camera sensor 408 has not only a function of capturing an image as a camera but also a sensor function of reading information embedded in a two-dimensional code such as a QR Code®. In this embodiment, the camera sensor 408 is used to read a QR code displayed on the operation unit 210 of the image forming apparatus 101, thereby acquiring information necessary for communication.

A disk drive for a portable disk recording medium such as a CD or DVD, a memory reader/writer for a portable nonvolatile recording medium such as a flash memory or micro SD, or the like may be connected to the system bus 409. A program in which processing contents according to this embodiment are written can be saved in the auxiliary storage device 403 via a portable storage medium, and then installed in the mobile terminal 103.

<Software Module Block Diagram of Image Forming Apparatus>

Figure 5:
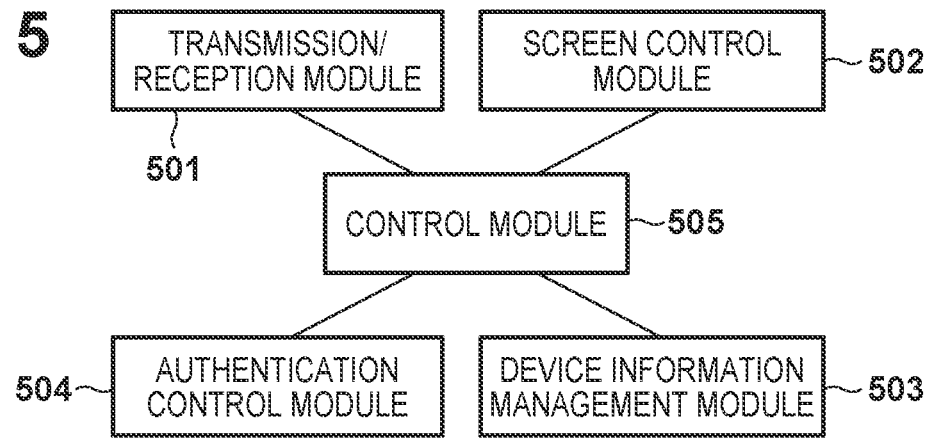
FIG. 5 is a block diagram showing the arrangement of the software modules of the image forming apparatus.

FIG. 5 is a block diagram showing the software module arrangement of the image forming apparatus 101 according to this embodiment. Each software module shown in FIG. 5 is stored as a program in the auxiliary storage device 203, and is loaded into the main storage device 202 and executed by the central processing unit 201.

A transmission/reception module 501 receives print data, transmits scan image, and transmits the device information using the network I/F 205 and the wireless communication sensor 209. A screen control module 502 accepts an operation from the user, and transmits it to a control module 505, thereby instructing execution of the various functions of the image forming apparatus 101.

A device information management module 503 stores and holds the internal device information in the auxiliary storage device 203 at a predetermined timing such as the timing of execution of a job, the timing of detection of a change in state of a part, the timing of occurrence of an error, or the timing of reaching a periodic holding schedule time.

An authentication control module 504 executes authentication processing based on authentication information received from the screen control module 502 and the transmission/reception module. If, as a result of the authentication processing, the user can be authenticated correctly, he/she is permitted to log in to the image forming apparatus 101 and operate the image forming apparatus 101. The control module 505 comprehensively controls transmission/reception of various kinds of data, screen control, holding of the device information, the authentication processing, and the like according to this embodiment.

<Software Module Block Diagram of Server>

Figure 6:
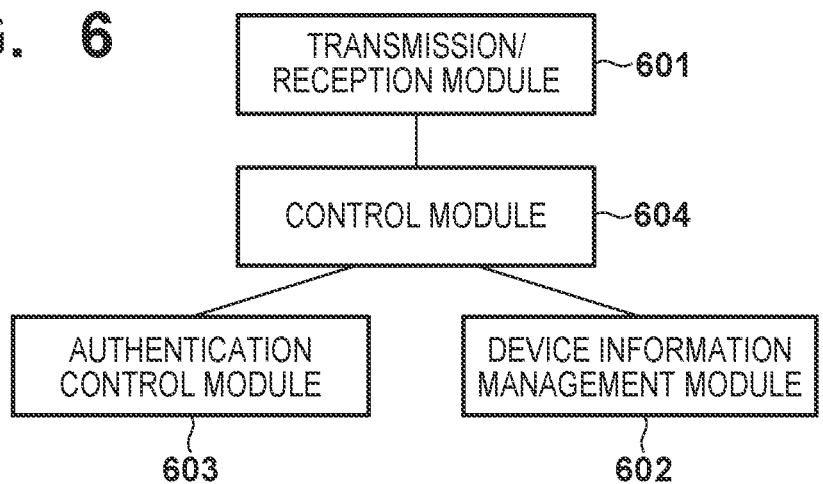
FIG. 6 is a block diagram showing the arrangement of the software modules of the server.

FIG. 6 is a block diagram showing the software module arrangement of the server 102 according to this embodiment. Each software module shown in FIG. 6 is stored as a program in the auxiliary storage device 304, and is loaded into the main storage device 302 and executed by the central processing unit 301.

A transmission/reception module 601 receives the device information transmitted from the image forming apparatus 101 or the mobile terminal 103 via the network I/F 303, and transmits maintenance information as a result of analyzing the device information to the mobile terminal 103, the PC of a serviceman, and the like.

A device information management module 602 manages the pieces of device information from the image forming apparatus 101 and the mobile terminal 103. The device information management module 602 registers and saves the received device information in the auxiliary storage device 304 together with auxiliary information such as a reception date for each image forming apparatus.

An authentication control module 603 executes authentication processing in response to a communication request transmitted from the mobile terminal 103. A control module 604 manages general control of transmission/reception of various kinds of data used in this embodiment, saving/management of the device information, and the authentication processing.

<Software Module Block Diagram of Mobile Terminal>

Figure 7:
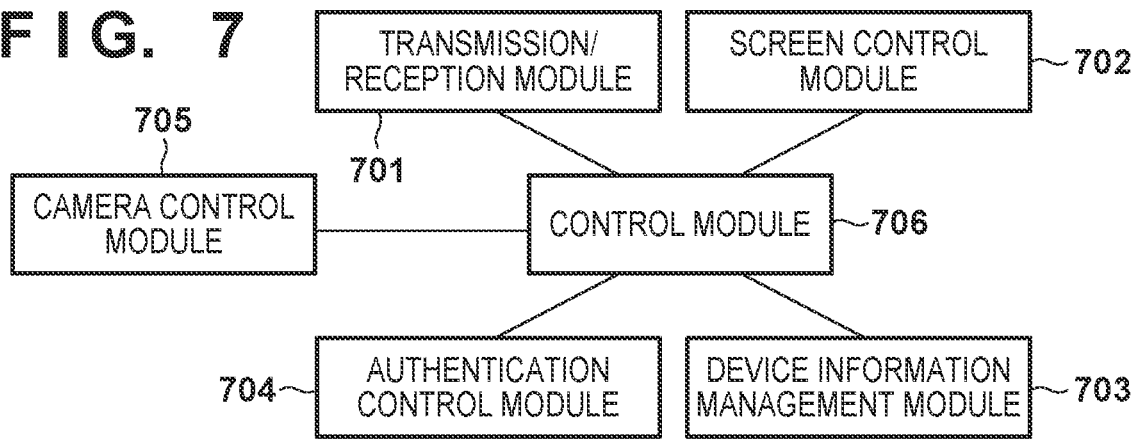
FIG. 7 is a block diagram showing the arrangement of the software modules of the mobile terminal.

FIG. 7 is a block diagram showing the software module arrangement of the mobile terminal 103 according to this embodiment. Each software module shown in FIG. 7 is stored as a program in the auxiliary storage device 403, and is loaded into the main storage device 402 and executed by the central processing unit 401.

A transmission/reception module 701 receives device information from the image forming apparatus 101 using the network I/F 404, and transmits the acquired device information to the server 102. A screen control module 702 accepts an operation from the user, and transmits it to a camera control module 705, thereby instructing execution of the various functions of the mobile terminal 103.

A device information management module 703 manages the device information acquired from the image forming apparatus 101. The device information management module 703 registers and saves the acquired device information in the auxiliary storage device 403 together with auxiliary information such as a reception date for each image forming apparatus.

An authentication control module 704 is used for authentication processing in communication with the image forming apparatus 101 and the server 102. In this embodiment, when communicating with the image forming apparatus 101, the camera control module 705 is used in advance to read a QR code displayed on the operation unit 210 of the image forming apparatus 101 and authentication processing for communication is executed. When acquiring the device information from the image forming apparatus 101 according to this embodiment, the image forming apparatus 101 operates in a special mode. On the other hand, if the image forming apparatus 101 operates in a normal mode, the mobile terminal 103 is controlled not to execute acquisition of the device information. Therefore, to be able to detect that the image forming apparatus 101 operates in the special mode, an identifier for discriminating that the image forming apparatus 101 operates in the special mode is embedded in the QR code displayed on the image forming apparatus 101. The mobile terminal 103 confirms whether the information read from the QR code includes the identifier. Only if the identifier is included, the mobile terminal 103 starts communication with the image forming apparatus 101 to acquire the device information.

The camera control module 705 controls the camera I/F 407 and the camera sensor 408 of the mobile terminal 103 to acquire information necessary for communication with the image forming apparatus 101. A control module 706 manages general control of various processes of transmission/reception of various kinds of data used in this embodiment, screen control, saving/management of the device information, authentication, and camera control.

<Device Information Acquisition Screen of Mobile Terminal Apparatus>

A device information acquisition screen displayed on the operation unit 406 of the mobile terminal 103 will be described next. The administrator of the image forming apparatus 101 acquires the device information from the image forming apparatus 101 using the mobile terminal 103. At this time, a device information acquisition application installed in the mobile terminal 103 is activated to start device information acquisition processing.

Figure 8A:
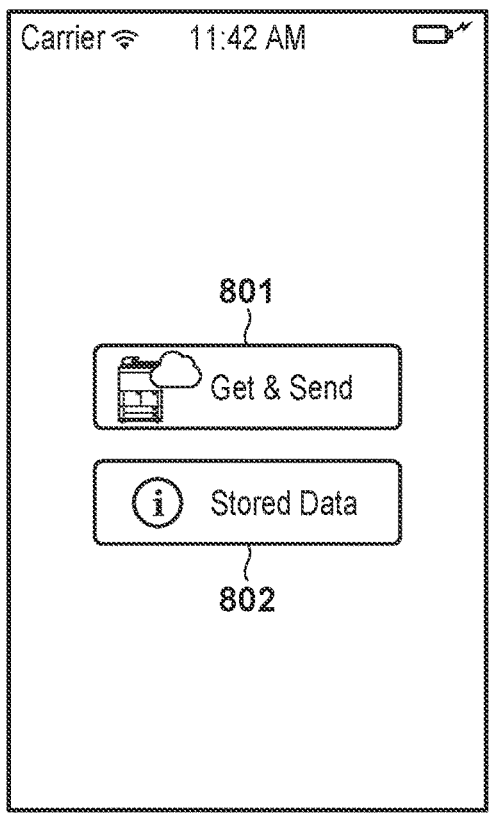
FIGS. 8A and 8B are views each showing a screen of the mobile terminal.
Figure 8B:
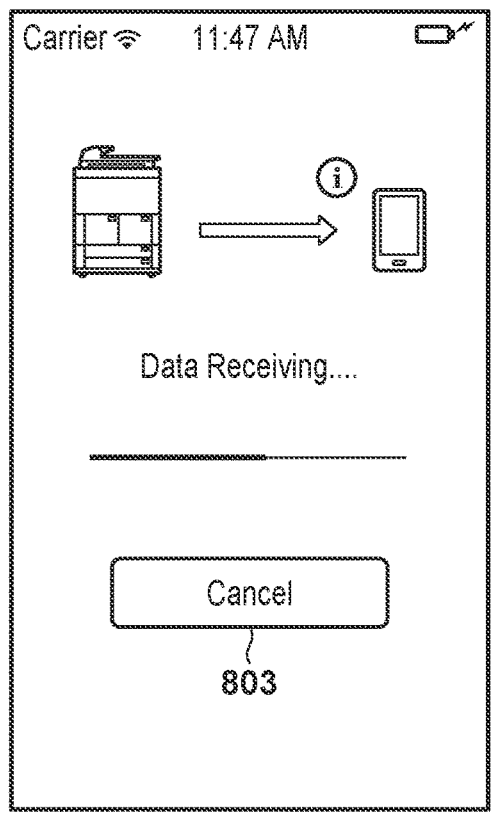

Screens shown in FIGS. 8A and 8B show an example of screen transition when activating and operating the device information acquisition application. As a transition order, the screen starts from FIG. 8A, and transitions to FIGS. 8B and 9A, thereby completing acquisition of the device information from the image forming apparatus 101. After that, in accordance with processing contents to be executed, there are a pattern of transitioning to FIGS. 9B and 10A, and a pattern of returning to FIG. 8A, transitioning to FIG. 10B, and then transitioning to FIGS. 9B and 10A later. The pattern of transitioning to FIGS. 9B and 10A corresponds to a case in which the acquired device information is continuously transmitted to the server 102. Referring back to FIG. 8A, the pattern of transitioning to FIG. 10B and then transitioning to FIGS. 9B and 10A later corresponds to a case in which the acquired device information is temporarily held in the memory area of the mobile terminal 103, and transmitted to the server 102 later.

The screen shown in FIG. 8A is the initial activation screen when the device information acquisition application is activated. When a "device information acquisition (Get & Send)" button 801 is selected, the screen transitions to the screen (FIG. 8B) for processing of acquiring the device information by communicating with the image forming apparatus 101. When a "device information retransmission (Stored Data)" button 802 is selected, the screen transitions to the screen (FIG. 10B) for processing of transmitting, to the server 102, the device information held in the memory area of the mobile terminal 103.

The screen shown in FIG. 8B is a screen displayed when communication with the image forming apparatus 101 starts to acquire the device information. When a "Cancel" button 803 is selected, the processing is canceled, and the screen returns to FIG. 8A.

Figure 9A:
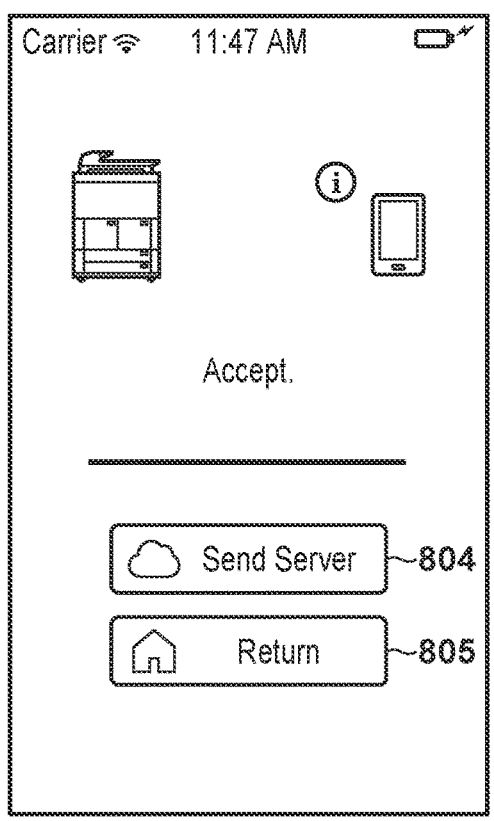
FIGS. 9A and 9B are views each showing a screen of the mobile terminal.

The screen shown in FIG. 9A is a selection screen for accepting, after completion of acquisition of the device information from the image forming apparatus 101, selection of whether to continuously transmit the device information to the server 102 or temporarily hold the device information in the memory area of the mobile terminal 103 to return to the activation screen shown in FIG. 8A. When a "device information transmission (Send Server)" button 804 for continuously transmitting the device information to the server 102 is selected, the screen transitions to FIG. 9B. When a "Return" button 805 for temporarily holding the device information in the memory area of the mobile terminal 103 is selected, the screen returns to FIG. 8A.

Figure 9B:
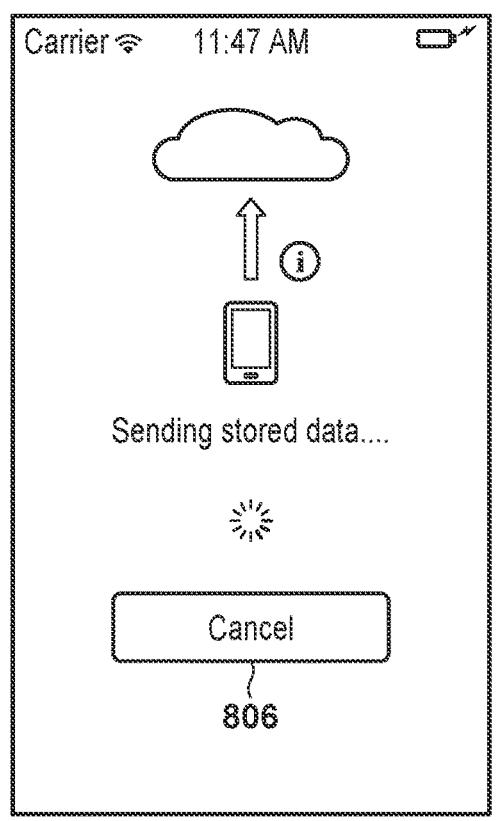

The screen shown in FIG. 9B is a screen displayed while the device information is transmitted to the server 102. When a "Cancel" button 806 is selected, the processing of transmitting the device information to the server 102 is canceled. In this case, the device information is automatically held in the memory area of the mobile terminal 103. Note that when transmitting the device information to the server 102, even if a communication error occurs to interrupt the transmission processing, the device information is automatically held in the memory area of the mobile terminal 103.

Figure 10A:
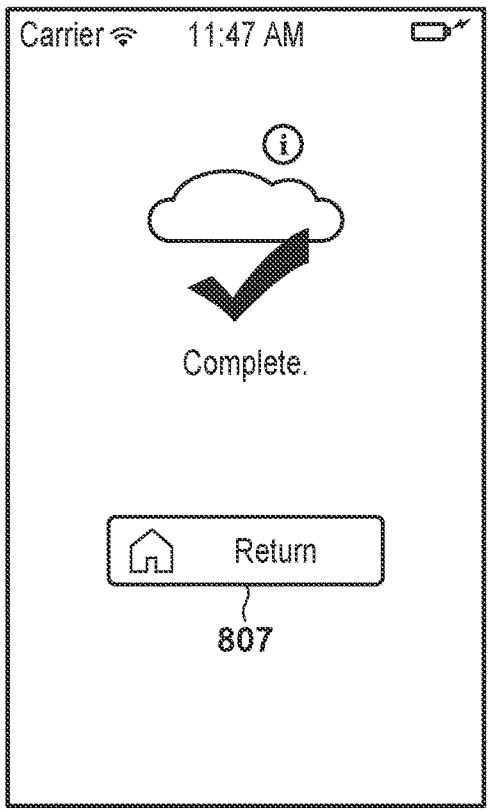
FIGS. 10A and 10B are views each showing a screen of the mobile terminal.

The screen shown in FIG. 10A is a screen displayed when the device information is correctly transmitted to the server 102. When a "Return" button 807 is selected, the screen returns to the activation screen shown in FIG. 8A.

Figure 10B:
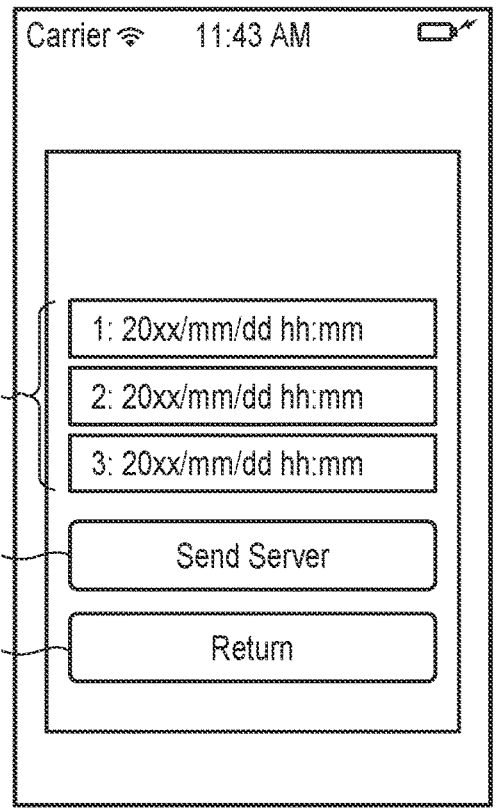

The screen shown in FIG. 10B is a screen that displays a list of pieces of device information held in the memory area of the mobile terminal 103. This screen displays a list of pieces of untransmitted device information which have been acquired from the image forming apparatuses 101 in the past and have not been transmitted to the server 102 yet. When the administrator of the image forming apparatus 101 selects one or a plurality of pieces of information of a device information list 808, and selects a "retransmission (Send Server)" button 809, he/she can transmit the device information to the server 102. When a "Return" button 810 is selected, the screen returns to the activation screen shown in FIG. 8A.

With the above procedure and screen transition, the mobile terminal 103 is used to acquire the device information of the image forming apparatus 101 and transmit the device information to the server 102.

<Procedure of Processing of Shifting to Device Information Acquisition Mode of Image Forming Apparatus>

Figure 11:
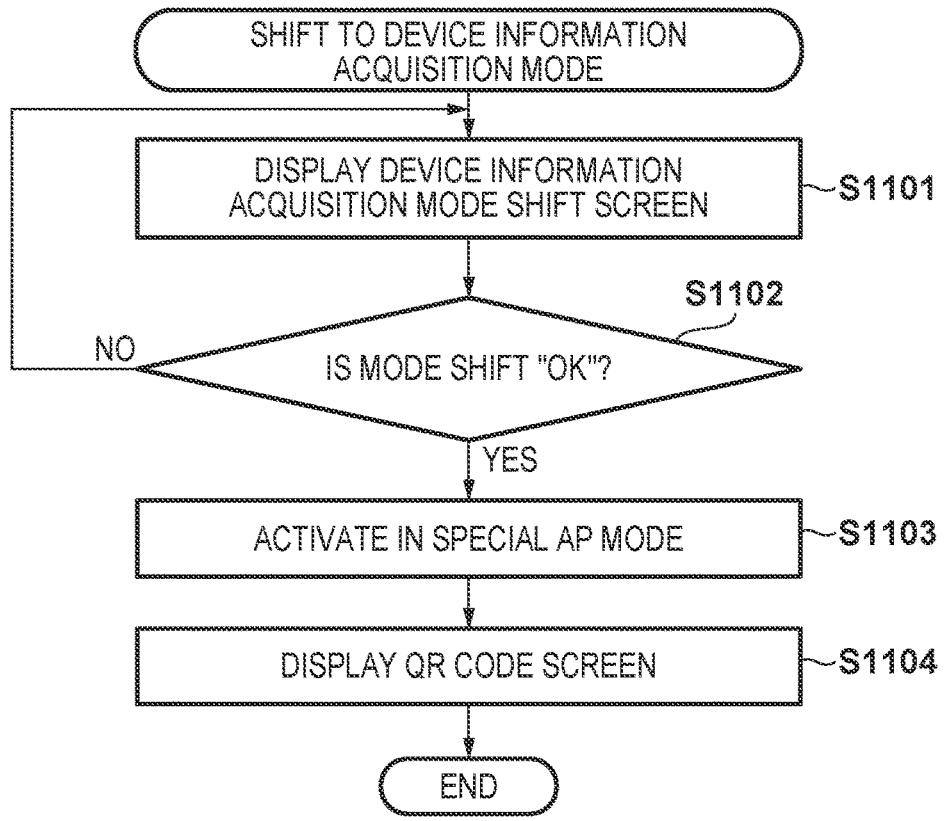
FIG. 11 is a flowchart illustrating processing of shifting to a device information acquisition mode in the image forming apparatus.

Processing of shifting to the device information acquisition mode of the image forming apparatus 101 will be described with reference to FIG. 11. To acquire the device information of the image forming apparatus 101 using the mobile terminal 103, the administrator of the image forming apparatus 101 needs to shift the image forming apparatus 101 to a mode (device information acquisition mode) for acquiring the device information in accordance with this procedure. In the device information acquisition mode, the image forming apparatus 101 operates as a special Wi-Fi access point, restricts (confine) a communication partner so as to enable only communication with the mobile terminal 103, and disables communication with other terminals. When the image forming apparatus 101 transitions to the device information acquisition mode, information (SSID, passkey, mode identifier, IP address, and the like) necessary for the mobile terminal 103 to perform connection to the access point of the image forming apparatus 101 is embedded in a QR code, and the QR code is displayed on the operation unit 210. When the administrator of the image forming apparatus 101 logs in to the image forming apparatus 101, and instructs, from a management screen, to display a device information acquisition mode screen, this processing starts.

In step S1101, the central processing unit 201 displays the device information acquisition mode screen.

Figure 18A:
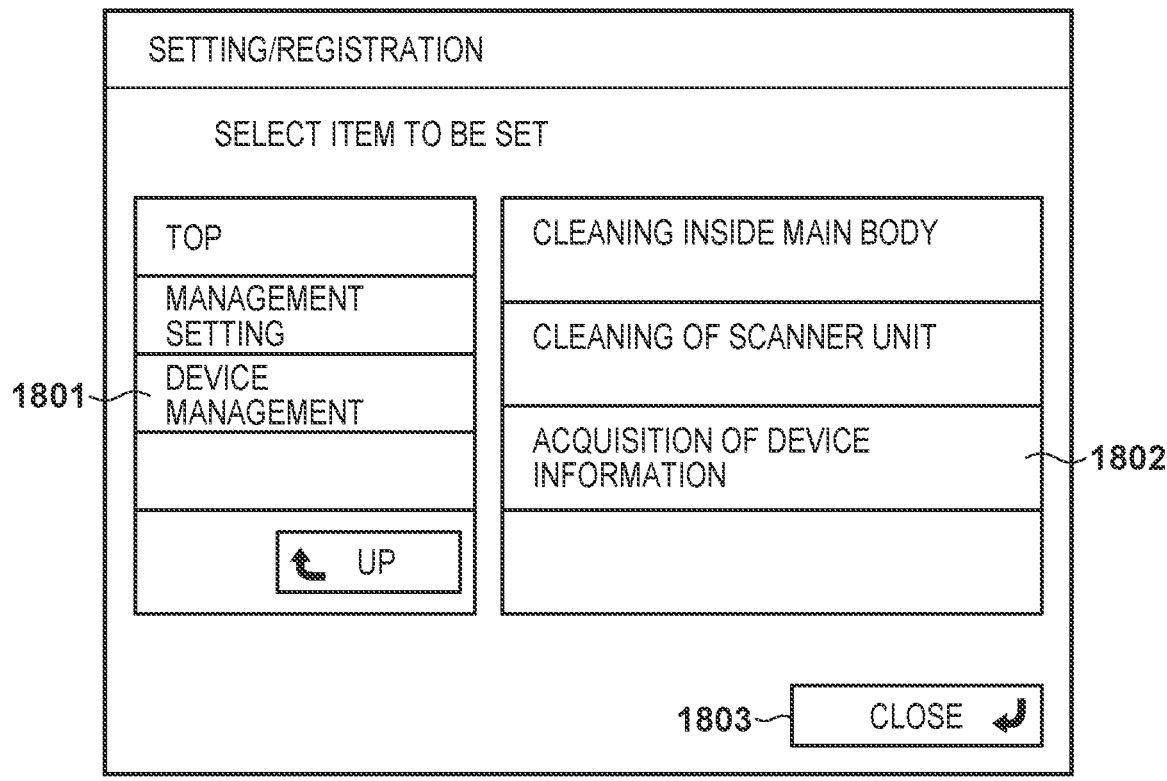
FIGS. 18A and 18B are views each showing a screen of the image forming apparatus.

FIG. 18A shows a "device management" menu as a part of a menu screen for the administrator. The "device management" menu is one menu of a "management setting" menu that makes it possible to make various maintenance settings of the image forming apparatus 101. When the administrator operates the operation unit of the image forming apparatus 101 to input authentication information such as an ID and a password for the administrator, he/she can obtain the authority to display this screen. A "device management" button 1801 is a button for displaying, in a right field, the "device management" menu that makes it possible to instruct cleaning necessary for maintenance of the various image forming apparatuses 101 and the like. When a "device information acquisition" button 1802 is selected, the screen transitions to a screen shown in FIG. 18B, thereby making it possible to advance a shift to the device information acquisition mode. When a "close" button 1803 is selected, control exits from the "device management" menu to return to the "management setting" menu as the menu of the upper layer.

In step S1102, the central processing unit 201 determines whether a mode shift is instructed in the device information acquisition mode screen. If a mode shift is instructed, the process advances to step S1103; otherwise, the process returns to step S1101.

Figure 18B:
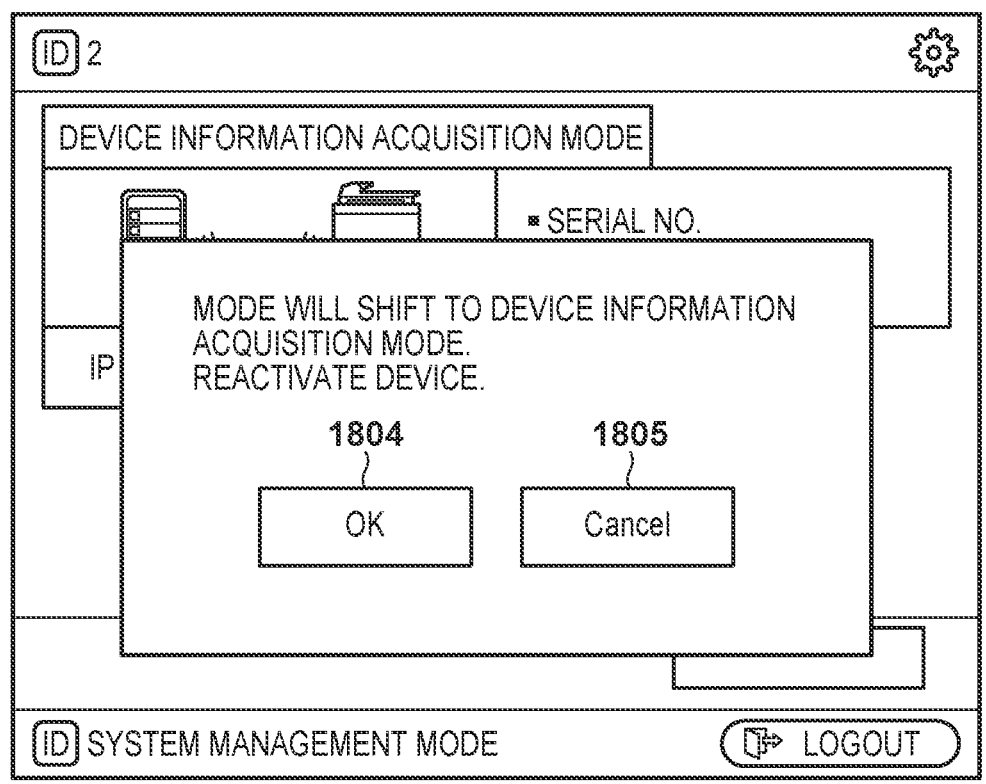

FIG. 18B shows a screen initially displayed when shifting to the device information acquisition mode. Since the device information acquisition mode is a mode of performing an operation in the special communication state, as described above, the image forming apparatus 101 is reactivated once to start in a special operation. When an "OK" button 1804 is selected, a reactivation instruction of the image forming apparatus 101 is accepted from the administrator, thereby starting a shift to the device information acquisition mode. The reactivation instruction corresponds to the above-described mode shift instruction. When a "Cancel" button 1805 is selected, the shift to the device information acquisition mode is canceled, and the screen returns to the screen shown in FIG. 18A.

In step S1103, the central processing unit 201 controls to operate in a special AP mode. The special AP mode indicates control of the transmission/reception module 501 as an access point for Wi-Fi communication, as described above. In this embodiment, only communication with the mobile terminal 103 is enabled and communication with other terminals is disabled.

In step S1104, the central processing unit 201 displays the QR code on the operation unit 210. As described above, the information (information used for a communication request, such as an SSID, passkey, mode identifier, and IP address) necessary for the mobile terminal 103 to perform connection to the access point of the image forming apparatus 101 is embedded in the QR code. Note that if this step ends, the image forming apparatus 101 waits for reception of a communication request from the mobile terminal 103 or an end instruction of the device information acquisition mode from the administrator. Processing when a communication request is received from the mobile terminal 103 will be described with reference to a flowchart shown in FIG. 12. Processing when an end instruction of the device information acquisition mode is received from the administrator will be described with reference to a flowchart shown in FIG. 13.

With the above processing, the processing of shifting to the device information acquisition mode of the image forming apparatus 101 is executed.

Figure 19A:
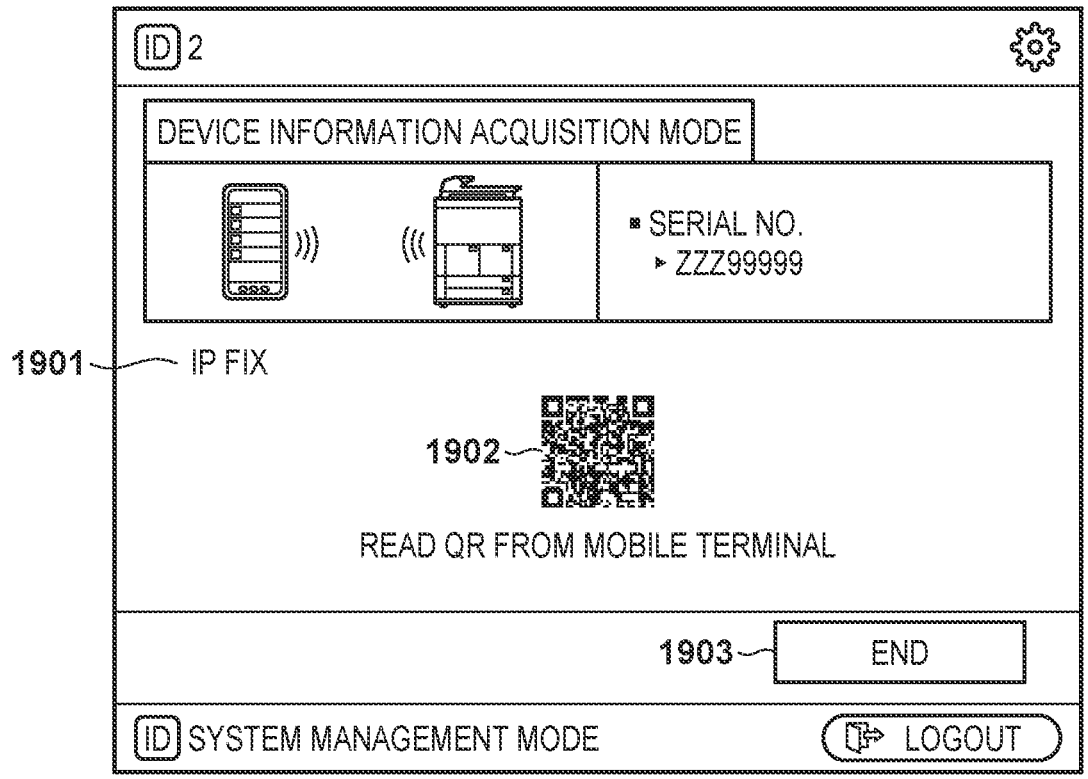
FIGS. 19A and 19B are views each showing a screen of the image forming apparatus.

FIG. 19A shows a screen displayed when the mode shifts to the device information acquisition mode. This screen is a screen displayed after reactivation is instructed by selecting the "OK" button 1804 shown in FIG. 18B and activation in the device information acquisition mode is completed. While the image forming apparatus 101 operates in the device information acquisition mode, it operates to accept only communication with the mobile terminal 103 on which a maintenance application is mounted. An "IP FIX" display 1901 is a notification indicating that the apparatus is operating in the special mode. By confirming this, the administrator can confirm that the image forming apparatus 101 can shift to the device information acquisition mode correctly. If no "IP FIX" display 1901 is displayed, activation in the device information acquisition mode has failed, and it is thus necessary to redo activation in the device information acquisition mode from the screen shown in FIG. 18A.

Information necessary for the mobile terminal 103 to communicate with the image forming apparatus 101 is embedded in a QR code 1902. While the image forming apparatus 101 operates in the device information acquisition mode, it operates as a special Wi-Fi communication access point (to be referred to as a special AP hereinafter) that accepts only communication with the mobile terminal 103. Therefore, an SSID and passkey as information of the special AP are embedded as communication information in the QR code. At the same time, an identifier indicating that the image forming apparatus 101 is operating in the device information acquisition mode is embedded. While the image forming apparatus 101 operates in this mode, it operates with an IP address different from that in the normal mode, and information of this IP address may be embedded to make it possible to notify the mobile terminal 103 of the information. An "end" button 1903 is a button that is selected to end the device information acquisition mode. When the "end" button 1903 is selected, the screen transitions to FIG. 19B.

Figure 19B:
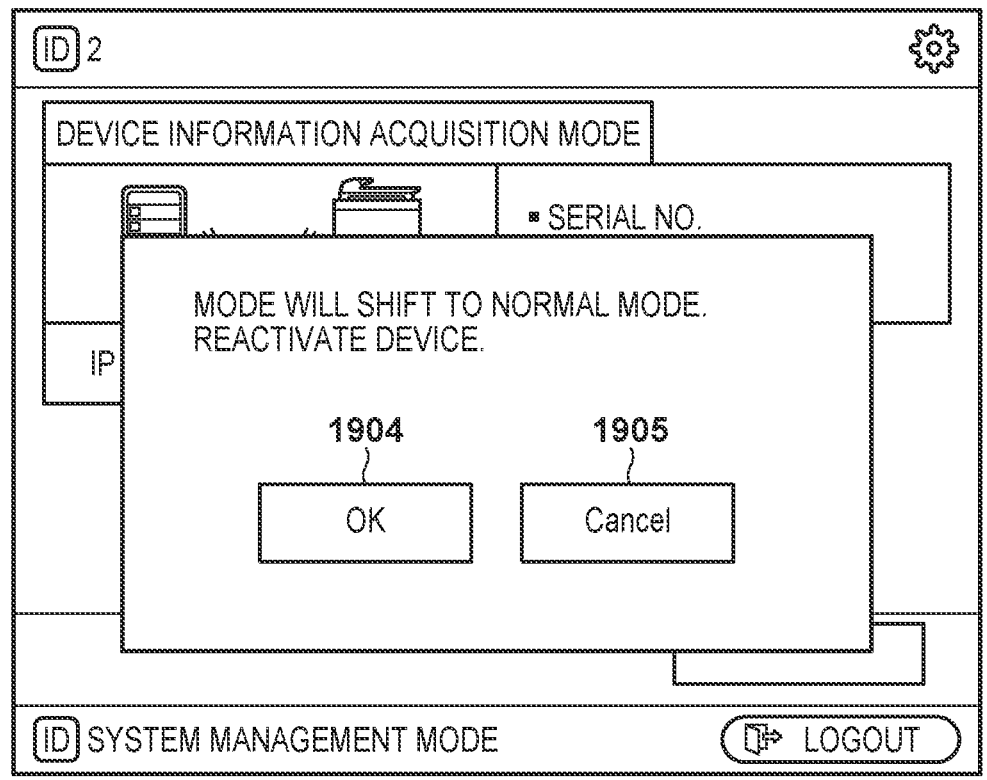

FIG. 19B shows a screen necessary to shift the image forming apparatus 101 from the device information acquisition mode to the normal mode. When the administrator selects an "OK" button 1904, he/she can return the image forming apparatus 101 to the normal mode. The image forming apparatus 101 performs reactivation to return the operation mode of itself to the normal mode. When a "Cancel" button 1905 is selected, the screen returns to the screen shown in FIG. 19A, and the image forming apparatus 101 continuously operates in the device information acquisition mode.

With the above screen transition and operation procedure, the image forming apparatus 101 can shift from the normal mode to the device information acquisition mode as a special mode, communicate with the mobile terminal 103 to transmit the device information, and return to the normal mode again.

<Procedure of Device Information Transmission Processing of Image Forming Apparatus>

Figure 12:
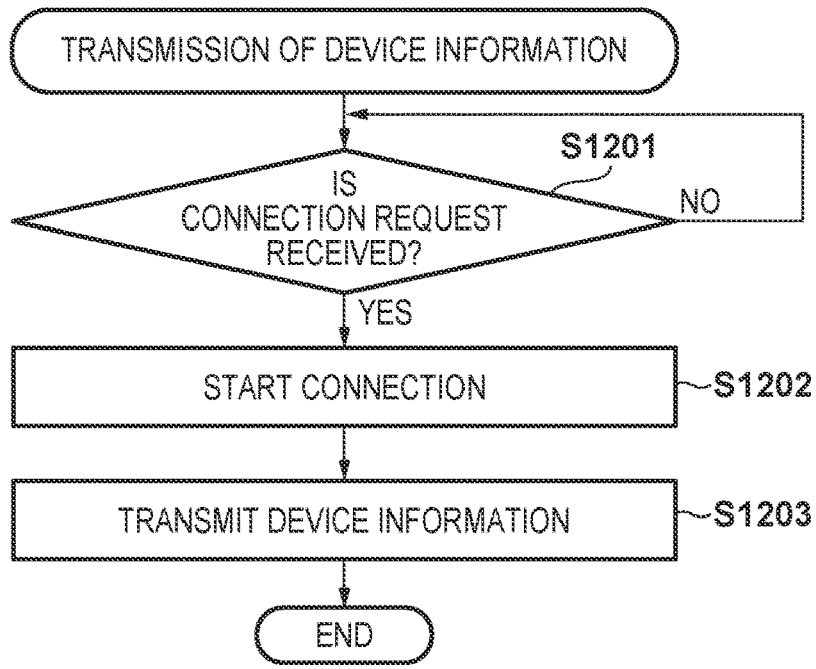
FIG. 12 is a flowchart illustrating device information transmission processing in the image forming apparatus.

The device information transmission processing of the image forming apparatus 101 will be described next with reference to FIG. 12. After shifting to the device information acquisition mode described with reference to FIG. 11, the image forming apparatus 101 waits for reception of a communication request from the mobile terminal 103 or an end instruction of the device information acquisition mode from the administrator while displaying the QR code on the operation unit 210. Upon receiving a communication request from the mobile terminal 103, the image forming apparatus 101 starts communication to transmit the device information. If no communication request is received from the mobile terminal 103 and an end instruction of the device information acquisition mode is received from the administrator, processing of shifting to the normal mode is executed in accordance with a procedure shown in FIG. 13. This processing will be described later. Upon detecting communication from the mobile terminal 103, this procedure starts.

In step S1201, the central processing unit 201 determines whether a communication request is received from the mobile terminal 103. If a communication request is received from the mobile terminal 103, the process advances to step S1202; otherwise, the processing in step S1201 is repeated to wait for an instruction from the administrator or a communication request from the mobile terminal 103.

In step S1202, the central processing unit 201 starts communication with the mobile terminal 103. In step S1203, the central processing unit 201 transmits the device information of the image forming apparatus 101 to the mobile terminal 103.

With the above processing, the device information transmission processing of the image forming apparatus 101 is executed.

<Procedure of Processing of Shifting to Normal Mode of Image Forming Apparatus>

Figure 13:
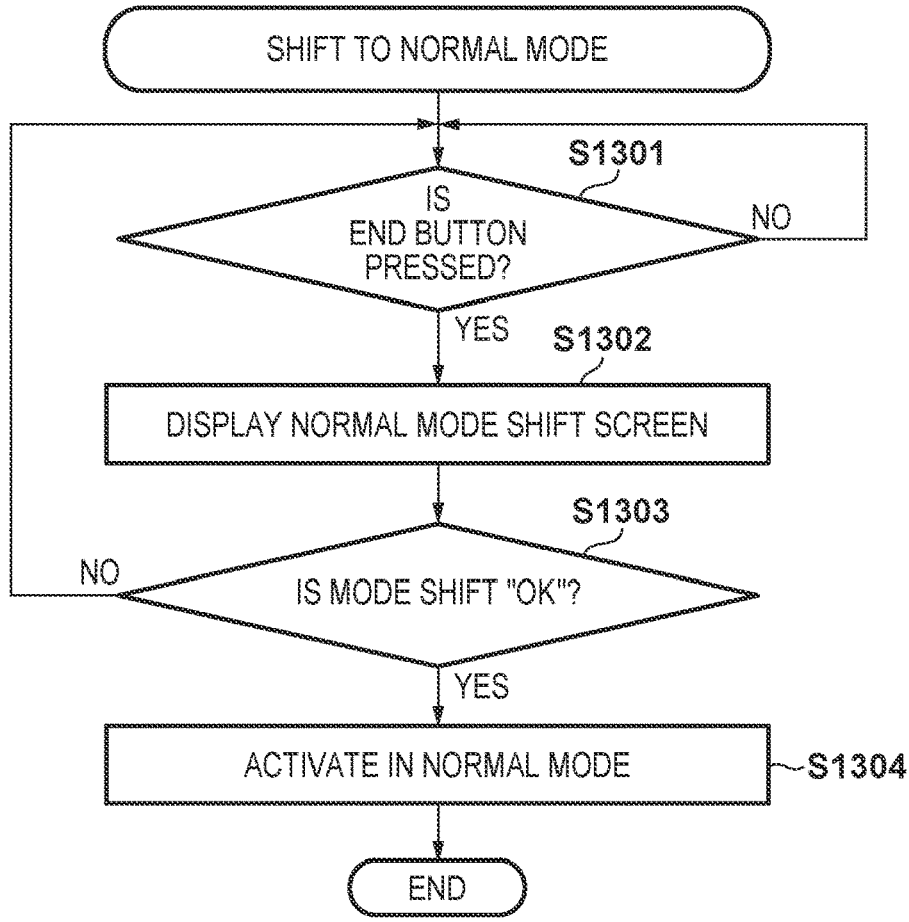
FIG. 13 is a flowchart illustrating processing of shifting to a normal mode in the image forming apparatus.

The processing of shifting to the normal mode of the image forming apparatus 101 will be described next with reference to FIG. 13. After transmitting the device information by communicating with the mobile terminal 103, the image forming apparatus 101 can return to the normal mode by an end instruction of the device information acquisition mode from the administrator in accordance with this procedure. As described above, in the device information acquisition mode, since only communication with the mobile terminal 103 is enabled and communication with other terminals is disabled, a normal job cannot be processed. Therefore, after completion of acquisition of the device information of the image forming apparatus 101, the administrator needs to return the image forming apparatus 101 to the normal mode in accordance with this procedure. Note that at the start of this procedure, the image forming apparatus 101 operates in the device information acquisition mode, and thus the QR code is kept displayed on the operation unit 210. Upon detecting an operation of the administrator on the operation unit 210, this procedure starts.

In step S1301, the central processing unit 201 determines whether the administrator provides an end instruction of the device information acquisition mode from the device information acquisition mode screen. If an end instruction is provided, the process advances to step S1302; otherwise, the process returns to step S1301 to wait for an instruction from the administrator or a communication request from the mobile terminal 103. The end instruction corresponds to, for example, the pressing of the "end" button 1903 shown in FIG. 19A.

In step S1302, the central processing unit 201 displays, on the operation unit 210, a pop-up screen for making a notification of a shift to the normal mode, thereby notifying the administrator of information indicating whether to shift to the normal mode again. This corresponds to, for example, the screen shown in FIG. 19B.

In step S1303, the central processing unit 201 determines whether the administrator approves a shift to the normal mode in the pop-up screen. For example, if a shift to the normal mode is approved by pressing the "OK" button 1904 shown in FIG. 19B, the process advances to step S1304. For example, if a shift to the normal mode is not approved by pressing the "Cancel" button 1905 shown in FIG. 19B, the mode shift is canceled, and thus the process returns to step S1301 to wait for an instruction from the administrator or a communication request from the mobile terminal 103.

In step S1304, the central processing unit 201 shifts the operation mode of itself from the device information acquisition mode to the normal mode.

With the above processing, the processing of shifting to the normal mode of the image forming apparatus 101 is executed.

<Procedure of Device Information Reception Processing of Server Apparatus>

Figure 14:
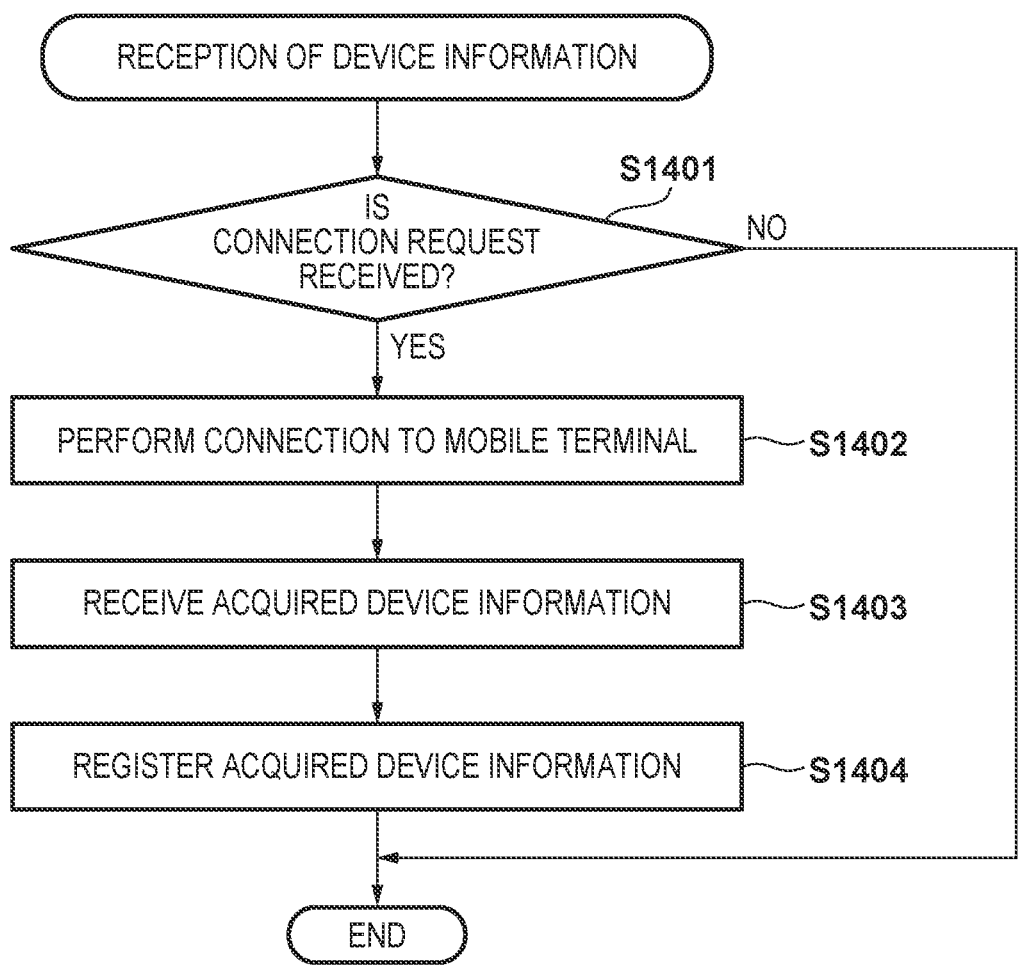
FIG. 14 is a flowchart illustrating device information reception processing in the server.

The device information reception processing of the server 102 will be described next with reference to FIG. 14. The server 102 receives, via the network 104, the device information acquired by the mobile terminal 103 from the image forming apparatus 101. The received device information is registered and saved in the auxiliary storage device 304 by the device information management module 602 of the server 102. Upon detecting communication from the mobile terminal 103, this procedure starts.

In step S1401, the central processing unit 301 determines whether a connection request is received from the mobile terminal 103. If a connection request is received, the process advances to step S1402; otherwise, the process ends.

In step S1402, the central processing unit 301 is connected to the mobile terminal 103. In step S1403, the central processing unit 301 receives the device information transmitted from the mobile terminal 103. In step S1404, the central processing unit 301 registers and saves the received device information in the auxiliary storage device 304 by the device information management module 602.

With the above processing, the device information reception processing of the server 102 is executed.

<Procedure of Device Information Transmission/Reception Processing of Mobile Terminal Apparatus>

Figure 15:
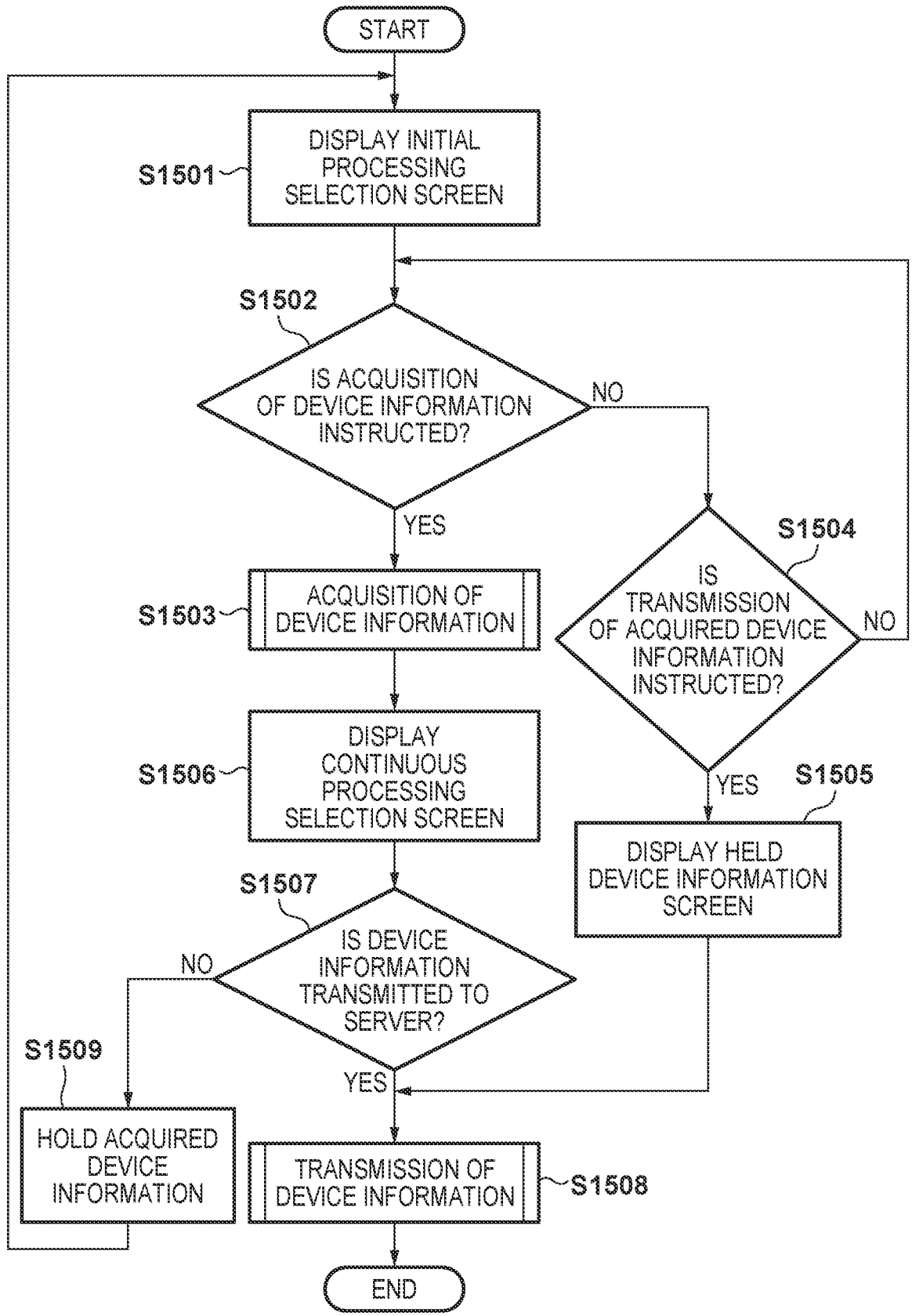
FIG. 15 is a flowchart illustrating device information transmission/reception processing in the mobile terminal.

The device information transmission/reception processing of the mobile terminal 103 will be described next with reference to FIG. 15. The mobile terminal 103 acquires device information from the image forming apparatus 101, and transmits the acquired device information to the server 102. The procedure starts from the initial screen shown in FIG. 8A, and the "device information acquisition (Get & Send)" button 801 and the "device information retransmission (Stored Data)" button 802 are displayed to be selectable. If the "device information acquisition (Get & Send)" button 801 is selected, communication with the image forming apparatus 101 is performed to acquire device information. If the "device information retransmission (Stored Data)" button 802 is selected, processing of transmitting, to the server 102, the device information already held in the memory area of the mobile terminal 103 is executed.

After acquiring the device information from the image forming apparatus 101 by selecting the "device information acquisition (Get & Send)" button 801, the continuous processing selection screen shown in FIG. 9A is displayed. In this selection screen, the "device information transmission (Send Server)" button 804 and the "Return" button 805 are displayed to be selectable. If the "device information transmission (Send Server)" button 804 is selected, processing of transmitting the acquired device information to the server 102 is executed. If the "Return" button 805 is selected, the screen returns to the initial screen, and the "device information acquisition (Get & Send)" button 801 and the "device information retransmission (Stored Data)" button 802 can be selected and processed again. If the device information acquisition application installed in the mobile terminal 103 is activated, this processing starts.

In step S1501, the central processing unit 401 displays the initial screen shown in FIG. 8A on the operation unit 406. In step S1502, the central processing unit 401 determines whether the "device information acquisition (Get & Send)" button 801 is selected in the initial screen. If the "device information acquisition (Get & Send)" button 801 is selected, the process advances to step S1503; otherwise, the process advances to step S1504. In step S1503, the central processing unit 401 executes device information acquisition processing shown in FIG. 16. A processing procedure will be described in detail later.

In step S1504, the central processing unit 401 determines whether the "device information retransmission (Stored Data)" button 802 is selected in the initial screen. If the "device information retransmission (Stored Data)" button 802 is selected, the process advances to step S1505; otherwise, the process returns to step S1502 again to wait for a selection instruction of the "device information acquisition (Get & Send)" button 801 or the "device information retransmission (Stored Data)" button 802. In step S1505, the central processing unit 401 displays the device information list screen shown in FIG. 10B.

In step S1506, the central processing unit 401 displays the continuous processing selection screen shown in FIG. 9A. In step S1507, the central processing unit 401 determines whether the "device information transmission (Send Server)" button 804 for transmitting the acquired device information to the server 102 is selected. If the "device information transmission (Send Server)" button 804 is selected, the process advances to step S1508; otherwise, the process advances to step S1509.

In step S1508, the central processing unit 401 executes device information transmission processing shown in FIG. 17. A processing procedure will be described in detail later. In step S1509, the central processing unit 401 holds the acquired device information in the memory area, and returns the process to step S1501.

With the above processing, the device information transmission/reception processing of the mobile terminal 103 is executed.

<Detailed Procedure of Device Information Reception Processing of Mobile Terminal Apparatus>

Figure 16:
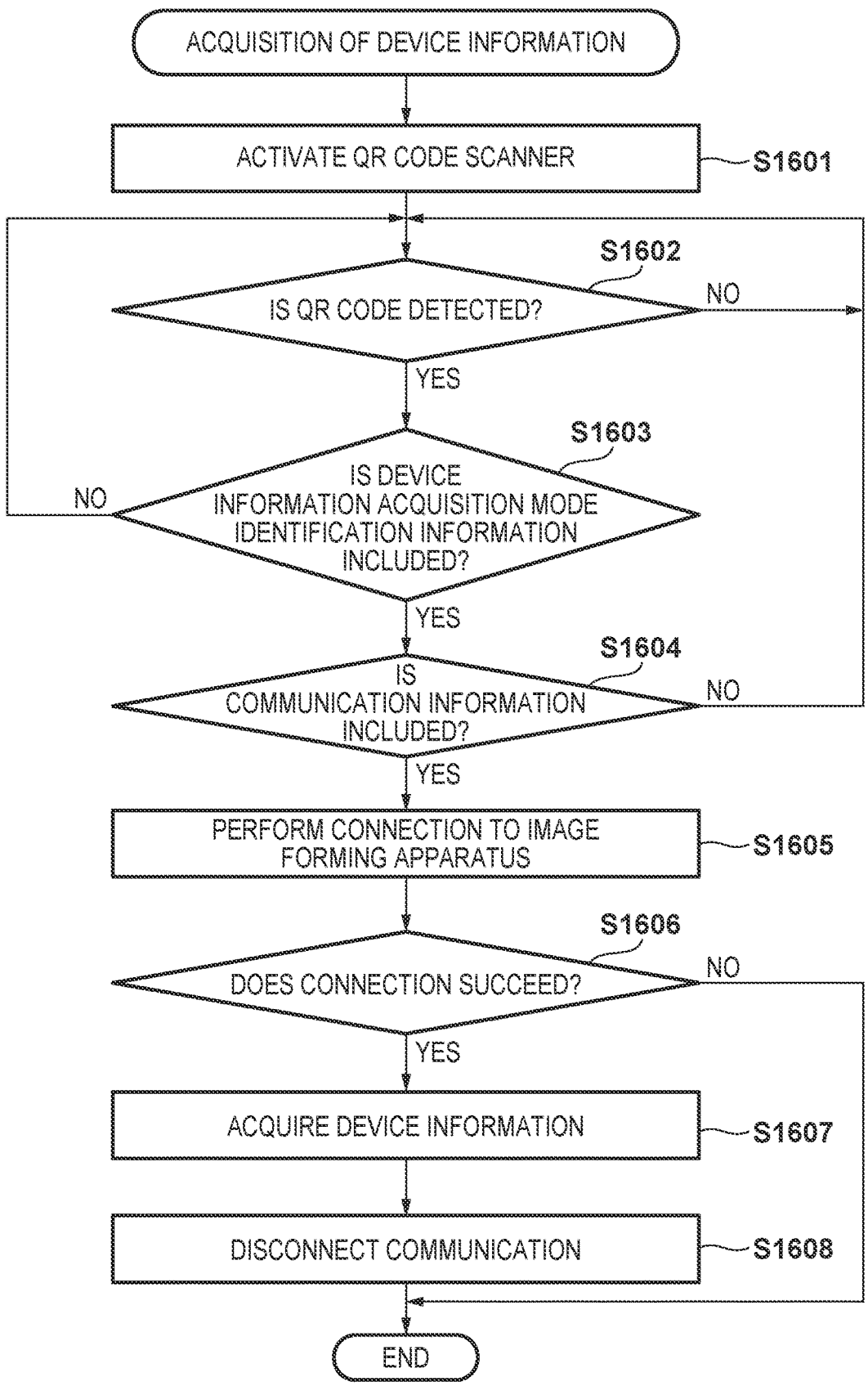
FIG. 16 is a flowchart illustrating device information reception processing in the mobile terminal.

The device information reception processing of the mobile terminal 103 will be described next with reference to FIG. 16. The mobile terminal 103 acquires the device information of the image forming apparatus 101 by wireless communication. Information necessary for wireless communication with the image forming apparatus 101 is acquired from the QR code displayed on the operation unit 210 while the image forming apparatus 101 operates in the device information acquisition mode. The mobile terminal 103 starts communication processing only if the image forming apparatus 101 operates in the device information acquisition mode when acquiring the device information from the image forming apparatus 101. Therefore, it is determined whether, as a result of reading the QR code, the mode identifier indicating that the image forming apparatus 101 is operating in the device information acquisition mode can be acquired. If the mode identifier can be acquired and all the information necessary for communication can be read, the mobile terminal 103 starts communication with the image forming apparatus 101 to acquire the device information. When the process advances to step S1503 of FIG. 15, this processing starts.

In step S1601, the central processing unit 401 controls the camera I/F 407 to activate a QR code scanner by the camera sensor 408, thereby starting QR code scanning.

In step S1602, the central processing unit 401 determines whether a QR code is detected by QR code scanning. If a QR code is detected, the process advances to step S1603; otherwise, the process returns to step S1602 to repeat the QR code scanning processing.

In step S1603, the central processing unit 401 determines whether information embedded in the QR code includes the mode identifier indicating that the image forming apparatus 101 is operating in the device information acquisition mode. If the mode identifier is included, the process advances to step S1604; otherwise, the process returns to step S1602 to repeat the QR code scanning processing.

In step S1604, the central processing unit 401 determines whether the information embedded in the QR code includes information (SSID, passkey, mode identifier, IP address, and the like) necessary for communication with the image forming apparatus 101. If the information is included, the process advances to step S1605; otherwise, the process returns to step S1602 to repeat the QR code scanning processing.

In step S1605, the central processing unit 401 starts communication with the image forming apparatus 101. In step S1606, the central processing unit 401 determines whether communication with the image forming apparatus 101 succeeds. If communication succeeds, the process advances to step S1607; otherwise, the process ends.

In step S1607, the central processing unit 401 acquires the device information from the image forming apparatus 101. In step S1608, the central processing unit 401 disconnects the communication from the image forming apparatus 101.

With the above processing, the device information reception processing of the mobile terminal 103 is executed.

<Detailed Procedure of Device Information Transmission Processing of Mobile Terminal Apparatus>

The device information transmission processing of the mobile terminal 103 will be described next with reference to FIG. 17. If acquisition of the device information from the image forming apparatus 101 is complete or the device information is already held in the memory area, the mobile terminal 103 transmits the device information to the server 102 in accordance with an instruction from the administrator. When the process advances to step S1508 of FIG. 15, this processing starts.

In step S1701, the central processing unit 401 starts communication with the server 102. In step S1702, the central processing unit 401 determines whether communication with the server 102 succeeds. If communication succeeds, the process advances to step S1703; otherwise, the process advances to step S1706.

In step S1703, the central processing unit 401 transmits the device information to the server 102. In step S1704, the central processing unit 401 disconnects the communication from the server 102.

In step S1705, the central processing unit 401 deletes the device information which has been held in the memory area and transmitted to the server 102. In step S1706, the central processing unit 401 holds the device information in the memory area again since communication with the server 102 has failed and the device information could not be transmitted.

With the above processing, the device information transmission processing of the mobile terminal 103 is executed.

As described above, in this embodiment, after acquiring the device information from the image forming apparatus 101, whether to continuously transmit the device information to the server 102 or hold the device information in the memory area of the mobile terminal 103 can be selected. With this arrangement, even if transmission of the device information acquired from the image forming apparatus 101 fails in an environment in which connection to the server 102 is unstable, maintenance processing of retransmitting the device information to the server 102 later can be performed. Furthermore, this arrangement can be used to acquire, in advance, the pieces of device information of the plurality of image forming apparatuses 101 and then collectively transmit them to the server 102 later.

In this embodiment, the maintenance service of analyzing the device information is provided in the server 102. The present invention, however, is not limited to this, and an arrangement in which the image forming apparatus 101 has the function of the server 102 is possible. Note that the device information described in this embodiment is assumed to include all or some of a job history, an error log, a service call log, an internal processing analysis log, and a consumable item log. However, the present invention is not limited to this. Any internal information of the image forming apparatus 101 usable for maintenance of the image forming apparatus 101 can be processed as device information in this embodiment.

In this embodiment, the arrangement is adopted, in which, after acquiring the device information of the image forming apparatus 101 using the mobile terminal 103, whether to continuously transmit the acquired device information to the server 102 or temporarily hold the device information in the memory area of the mobile terminal 103 and transmit it to the server 102 again later can be selected. However, after acquiring the device information of the image forming apparatus 101, selection of processing to be continued is not always necessary. An arrangement may be adopted, in which a screen for selecting processing to be continued after acquiring the device information is displayed manually or automatically in accordance with the success/failure of the device information transmission processing, the radio field intensity status of a network environment, an application setting, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060740, filed Mar. 27, 2018, which is hereby incorporated by reference herein in its entirety.

What is claimed is:

1. An information processing apparatus comprising:
a wireless interface configured to perform communication with an image forming apparatus; and
at least one controller configured to function as:
a unit configured to acquire device information of the image forming apparatus from the image forming apparatus through the wireless interface;
a unit configured to selectively accept one of a first instruction to transmit the acquired device information to an external destination and a second instruction not to transmit the acquired device information to the external destination; and
a unit configured to transmit, in a state where the first instruction has been accepted, the acquired device information to the external destination, and hold, in a state where the second instruction has been accepted, the acquired device information without transmitting the acquired device information to the external destination.

2. The information processing apparatus according to claim 1, further comprising:
a storage configured to store, in a state where the second instruction has been accepted, the acquired device information,
wherein the at least one controller is further configured to function as a unit configured to accept a third instruction to transmit the device information stored in the storage to the external destination, and
wherein in a state where the third instruction has been accepted, the at least one controller transmits the stored device information to the external destination.

3. The information processing apparatus according to claim 2, wherein the at least one controller causes a display to display a plurality of pieces of device information stored in the storage, and accepts a selection from the plurality of pieces of device information.

4. The information processing apparatus according to claim 2, wherein the storage further stores the device information for which transmission to the external destination has failed.

5. The information processing apparatus according to claim 1, wherein the information processing apparatus comprises a mobile terminal capable of performing wireless communication with the image forming apparatus.

6. A communication system comprising an image forming apparatus, a mobile terminal, and a server,
the image forming apparatus including a first wireless interface and at least one controller configured to function as:
a unit configured to shift, in accordance with an instruction from a user, the image forming apparatus to a mode in which the mobile terminal can acquire device information of the image forming apparatus,
the mobile terminal including a second wireless interface and at least one controller configured to function as:
a unit configured to acquire the device information from the image forming apparatus through the second wireless interface,
a first acceptance unit configured to selectively accept one of a first instruction to transmit the acquired device information to the server and a second instruction not to transmit the acquired device information to the server, and
a unit configured to transmit, in a state where the first instruction has been accepted, the acquired device information to the server, and hold, in a state where the second instruction has been accepted, the acquired device information in the mobile terminal without transmitting the acquired device information to the server, and
the server including
a unit configured to receive the transmitted device information.

7. The communication system according to claim 6, wherein
the mobile terminal further includes
a storage configured to store, in a state where the second instruction has been accepted, the acquired device information,
wherein the at least one controller is further configured to function as a unit configured to accept a third instruction to transmit the device information stored in the storage to the server, and
wherein in a state where the third instruction has been accepted, the at least one controller transmits the stored device information to the server.

8. The communication system according to claim 7, wherein the at least one controller causes a display to display a plurality of pieces of device information stored in the storage, and accepts a selection from the plurality of pieces of device information.

9. The communication system according to claim 6, wherein the storage further stores the device information for which transmission to the server has failed.

10. The communication system according to claim 6, wherein
the at least one controller of the image forming apparatus is further configured to function as:
a unit configured to hold communication information for executing communication between the mobile terminal and the image forming apparatus to be acquired by the mobile terminal after a shift to the mode by the shift unit, and
a unit configured to transmit the device information to the mobile terminal in response to a request from the mobile terminal in communication with the mobile terminal executed based on the communication information acquired by the mobile terminal,
the at least one controller of the mobile terminal is further configured to function as:
a unit configured to acquire the communication information from the image forming apparatus, and
a unit configured to request the device information in the communication with the image forming apparatus executed based on the acquired communication information, and
the at least one controller of the mobile terminal acquires the device information transmitted from the image forming apparatus.

11. The communication system according to claim 10, wherein the at least one controller of the image forming apparatus is further configured to function as a unit configured to confine a communication partner of the image forming apparatus to the mobile terminal while the communication is executed based on the communication information.

12. The communication system according to claim 11, wherein the at least one controller of the image forming apparatus confines the communication partner of the image forming apparatus to the mobile terminal by operating the image forming apparatus as an access point that enables only communication with the mobile terminal.

13. The communication system according to claim 10, wherein
the at least one controller of the image forming apparatus holds the communication information as a QR code, and
the at least one controller of the mobile terminal acquires the communication information by reading the QR code displayed on the image forming apparatus.

14. The communication system according to claim 13, wherein the at least one controller of the mobile terminal is further configured to function as a unit configured to request a start of the communication based on the acquired communication information.

15. A communication method executed in an information processing apparatus, comprising:
acquiring device information of an image forming apparatus from the image forming apparatus through a wireless interface of the information processing apparatus;
selectively accepting one of a first instruction to transmit the acquired device information to an external destination and a second instruction not to transmit the acquired device information to the external destination; and
transmitting, in a state where the first instruction has been accepted, the acquired device information to the external destination, and holding, in a state where the second instruction has been accepted, the acquired device information in the information processing apparatus without transmitting the acquired device information to the external destination.

16. A communication method executed in a communication system including an image forming apparatus, a mobile terminal, and a server, the method comprising:
causing the image forming apparatus to shift, in accordance with an instruction from a user, the image forming apparatus to a mode in which the mobile terminal can acquire device information of the image forming apparatus;
causing the mobile terminal to
acquire the device information from the image forming apparatus through a wireless interface of the mobile terminal,
selectively accept one of a first instruction to transmit the acquired device information to the server and a second instruction not to transmit the acquired device information to the server, and
transmit, in a state where the first instruction has been accepted, and hold, in a state where the second instruction has been accepted, the acquired device information in the mobile terminal without transmitting the acquired device information to the server; and
causing the server to receive the transmitted device information.

17. A non-transitory computer-readable storage medium storing a program for causing a computer to function to:
acquire device information of an image forming apparatus from the image forming apparatus through a wireless interface of the mobile terminal;
selectively accept one of a first instruction to transmit the acquired device information to an external destination and an instruction not to transmit the acquired device information to the server; and
transmit, in a state where the first instruction has been accepted, the acquired device information to the external destination, and hold, in a state where the second instruction has been accepted, the acquired device information in the information processing apparatus without transmitting the acquired device information to the external destination.

* * * * *